Figure 1:
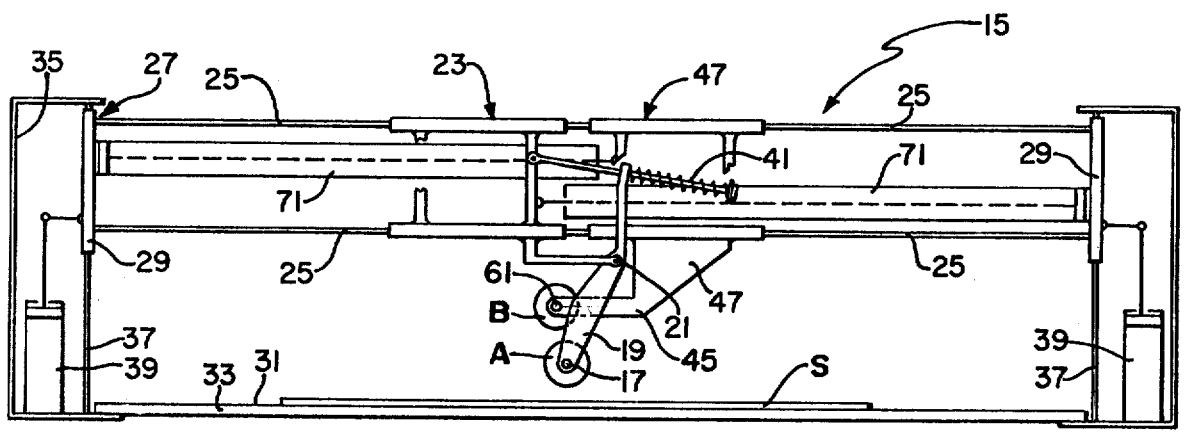

United States Patent [19]

Felten

[11] 4,210,042
[45] Jul. 1, 1980

[54] METHOD FOR PARTING PLY STOCK BETWEEN SIDE-BY-SIDE CORDS OR WIRES

[75] Inventor: Gilbert A. Felten, Kehlen, Luxembourg

[73] Assignee: The Goodyear Tire & Rubber Company, Akron, Ohio

[21] Appl. No.: 6,057

[22] Filed: Jan. 24, 1979

Related U.S. Application Data

[62] Division of Ser. No. 855,098, Nov. 25, 1977, Pat. No. 4,156,378.

[51] Int. Cl.² ............................................. B26D 11/00
[52] U.S. Cl. ........................................ 83/49; 83/56; 83/508; 83/555
[58] Field of Search ................... 83/863, 864, 56, 508, 83/614, 922, 49, 555, 587

[56] References Cited

U.S. PATENT DOCUMENTS

| 2,609,049 | 9/1952 | Rayburn | 83/863 X |
| 3,633,447 | 1/1972 | Casida | 83/508 X |

Primary Examiner—J. M. Meister
Attorney, Agent, or Firm—R. S. Washburn

[57] ABSTRACT

A simple direct acting mechanism moves a circular rotatable disc cutter or two such cutters first to rollably engage a hard surface and then to traverse the surface to part the stock between a side-by-side pair of cords or wires. The cutter or cutters are blunt edged, as well as unheated and so avoid baring the cords or wires while parting the stock without the undesired effect of sharp or hot knives. The cutter or cutters are shiftable along the axis or axes to accommodate deviation of the cords with respect to the travel of the cutter. The foregoing abstract is not to be taken as limiting the invention of this application, and in order to understand the full nature and extent of the technical disclosure of this application, reference must be made to the accompanying drawing and the following detailed description.

3 Claims, 10 Drawing Figures

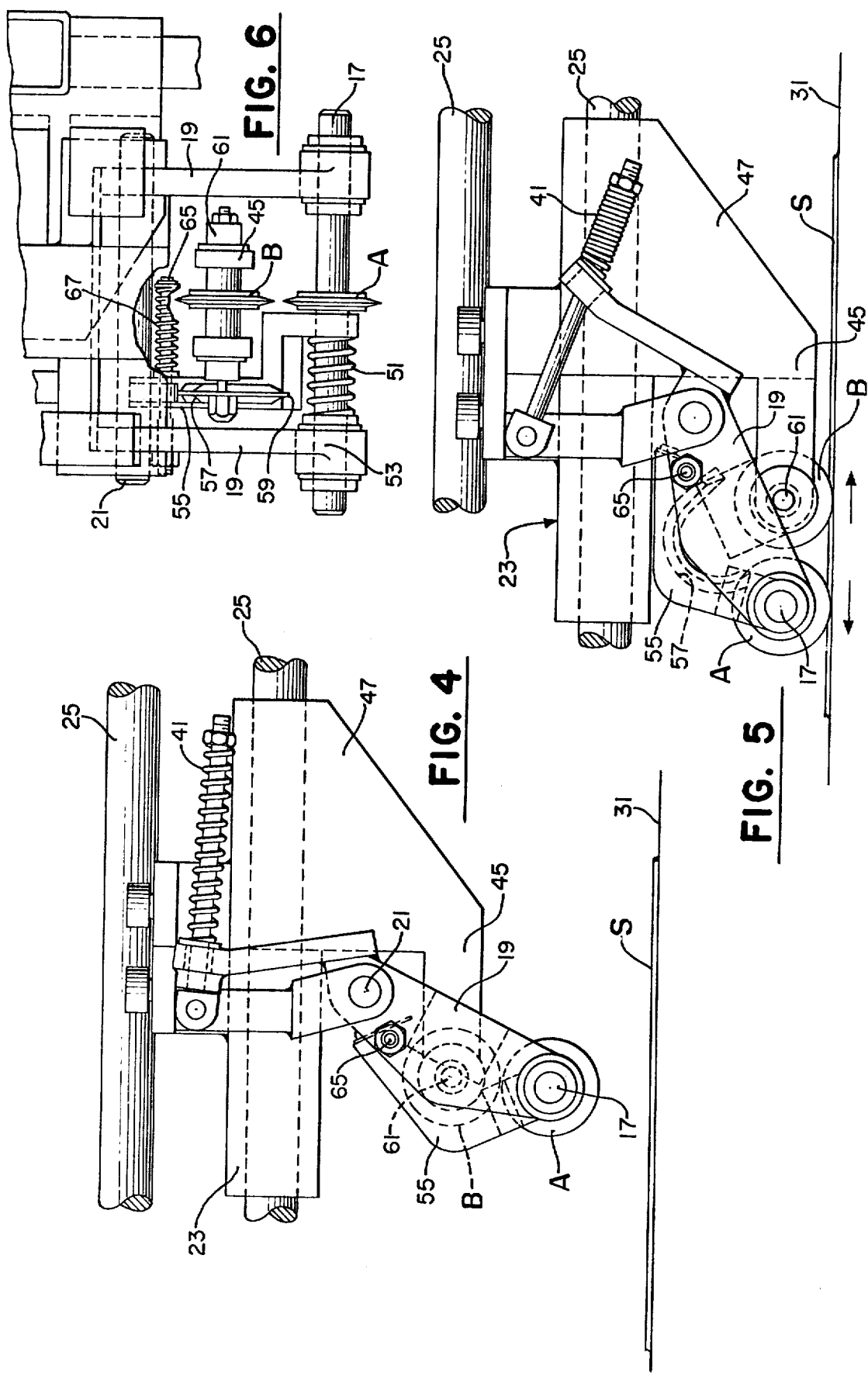

METHOD FOR PARTING PLY STOCK BETWEEN SIDE-BY-SIDE CORDS OR WIRES

This is a division of application Ser. No. 855,098 filed Nov. 25, 1977, now Pat. No. 4,156,378.

The present invention relates to improved apparatus for cutting tire ply stock and the like.

The invention aims to overcome certain difficulties which have appeared in the operation of apparatus heretofore available. The invention features freely rotatable disc-cutters having blunt circular edges which are unheated.

It has been found that knife blades can too often damage cord or wire, particularly if the blade is heated. Moreover, it has been found that the rotatable blunt edged disc-cutter is capable of parting the reinforced material repeatedly without causing bare wires or cords, a recurrent problem in the practices of the prior art. Also, the knife blade requires a slot to accommodate its protrusion through the sheet material and such a slot prevents adequate support to the sheet material if the width of the slot is sufficient to accommodate motion of the knife laterally with respect to its line of travel, to cope with normally present wire or cord deviations. The disc-cutter of the present apparatus cooperates with a plane hard surface against which the cutter rolls to sever the rubbery gum of the sheet material between but spaced from each of the adjacent cords or wires. The cutter has a further advantage in that it is less likely to displace the sheet material in the direction of the cut, which displacement has caused difficulties in the apparatus heretofore available. Finally, by the use of the cold, that is unheated, disc-cutters, there is no risk as heretofore of heating the trimmed edges of the material sufficiently to inhibit good splicing in the subsequent operations.

Briefly but broadly, the invention comprises apparatus for parting tire-making sheet material having parallel closely spaced cords or wires embedded in uncured rubbery gum, the apparatus comprising frame means, support means in the frame means having an uninterrupted hard surface for supporting said material, carrier means mounted on said frame means to extend transversely of the support means and mounted for movement toward and away from said surface in parallel relation thereto, carriage means mounted on the carrier means for movement transversely of the support means and parallel thereto, swing arm means pivotally mounted on the carriage means to swing in a plane normal to said surface about a pivot axis, a cutter shaft carried by the swing arm means, and a disc-cutter having a blunt circular cutting edge rollably engageable with said hard surface to sever only said gum between a side-by-side pair of said cords or wires, said disc-cutter being mounted to rotate freely on the shaft, said cutter and said cutter shaft being displaceable coaxially of the shaft in response to deviations of said pair of cords or wires relative to the direction of movement of the carriage.

Figure 2:
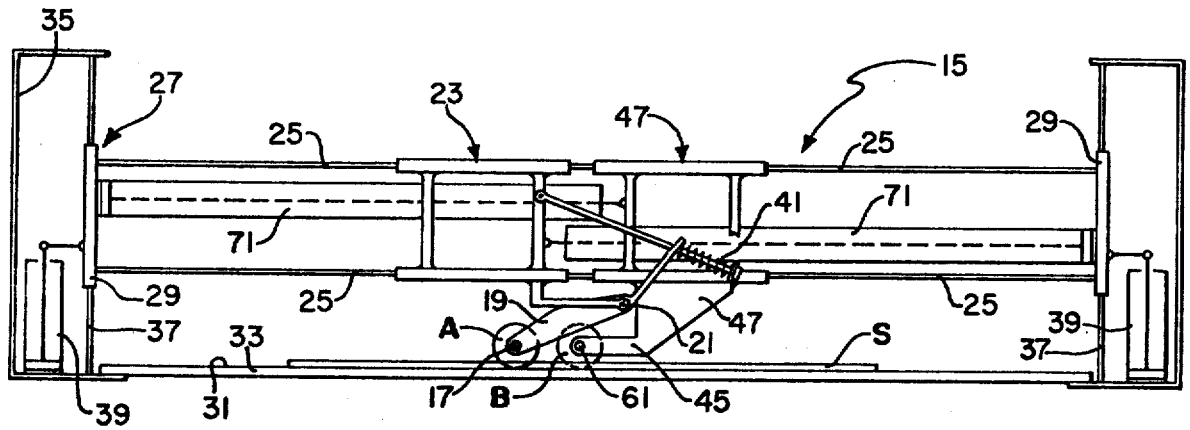
Figure 3:
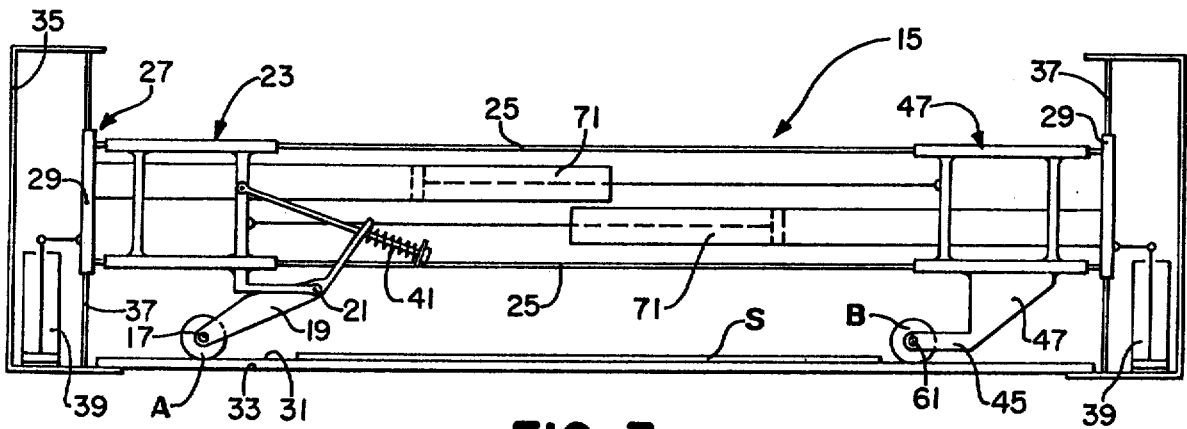
Figure 7:
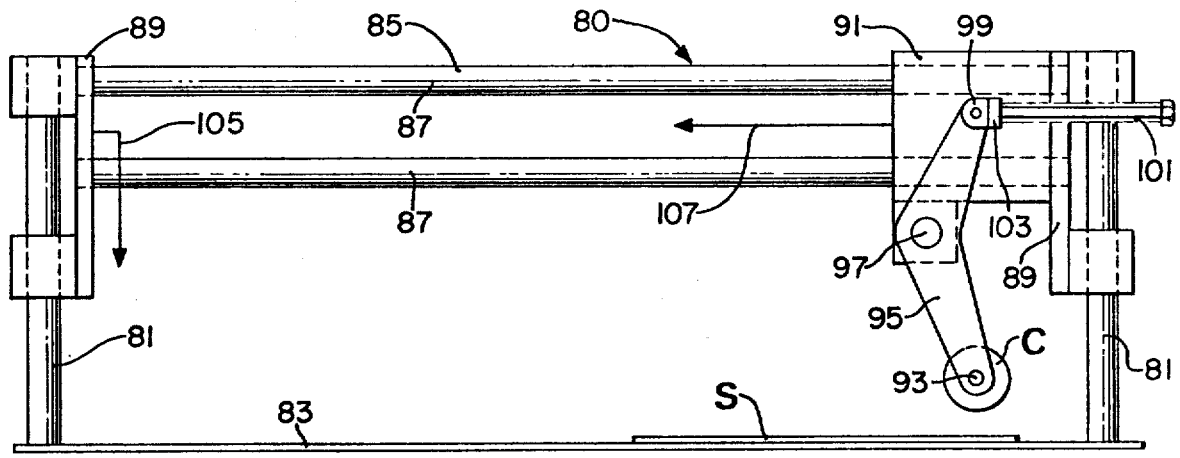
Figure 8:
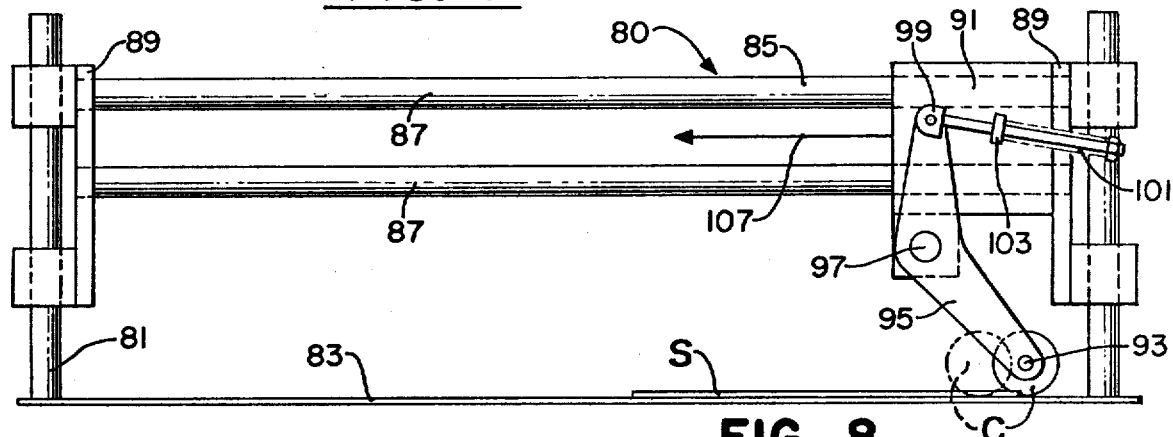
Figure 9:
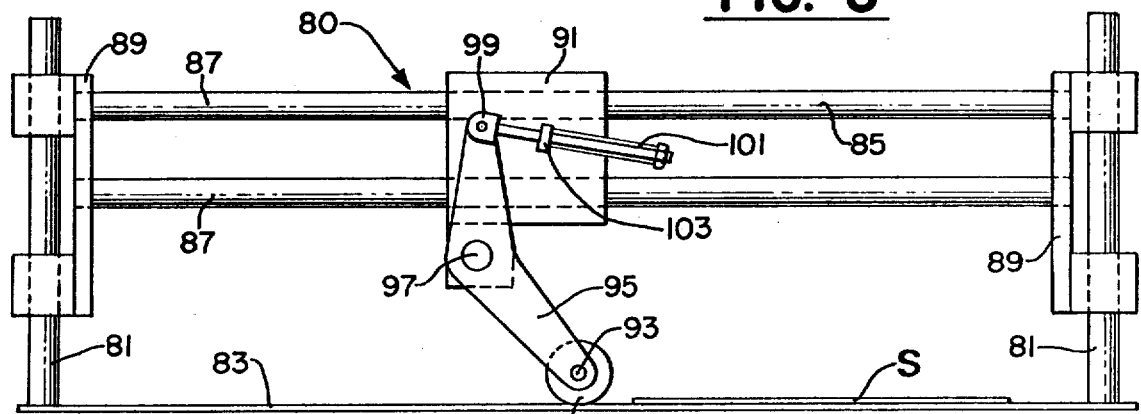
Figure 10:
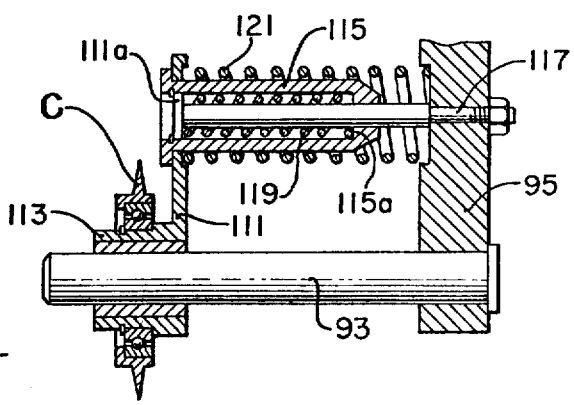

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof. In the drawings:

FIGS. 1, 2, and 3 illustrate schematically, in front elevation, an apparatus embodying one aspect of the invention;

FIGS. 4, 5, and 6 illustrate in enlarged detail a portion of the apparatus of FIGS. 1, 2, and 3;

FIGS. 7, 8, and 9 illustrate schematically, in front elevation, an apparatus embodying another aspect of the invention;

FIG. 10 illustrates schematically a portion of the apparatus of FIGS. 7, 8, and 9.

Referring generally to the drawings and particularly to FIGS. 1, 2, and 3, the apparatus 15 for severing or parting tire building sheet material, referred to herein as ply stock S, includes two disc-cutters each having a circular blunt edge. The two cutters are, for purposes of description, designated A and B. Cutter A is mounted on a non-rotatable shaft 17 which is axially movable normal to the plane of the figure and which is carried in a bifurcated link 19 which provides swing arm means, and which is pivotally connected by a pin 21 to a first carriage means 23 which is slidably mounted on slide bars or rails 25 of the carrier means 27. The slide bars 25 are mounted on end members 29 which are slidably carried for movement of the carrier means 27 toward and away from the hard surface 31 of the table 33 which provides support means on which the ply stock to be cut is disposed. The frame means 35, of any suitable construction, includes vertical slideways 37 which accommodate the movement of the carrier means 27 toward and away from the hard surface 31 against which the cutters A and B are rolled to sever the gum between a side-by-side pair of cords or wires of the ply stock S. Means for moving the carrier means are provided in the form of air cylinders 39 or any suitable equivalent. The position of the link 19 with respect to the first carriage means 23 is controlled in part by spring means 41 which is connected to bias the link 19 anti-clockwise, as seen in FIG. 1, about the pivot 21.

The second cutter B is also mounted on a shaft which is supported at each side of the cutter in a bifurcated arm 45 fixed in the second carriage means 47. The second carriage means is mounted on the carrier means 27 for traverse oppositely of the first carriage means along the slide bars 25 in such a manner that the two carriage means 23,47 move together toward and away from the surface of the table 33.

Ply stock S to be parted between a side-by-side pair of cords or wires therein is moved in a direction normal to the plane of the figures by suitable conveyors (not shown). Preferably, the conveyor arrangement provides for advancing the ply stock by a predetermined distance from a first parting stroke to a second parting stroke thereby providing cut-to-length pieces of ply stock of uniform length suitable for the operation being served.

In operation, the apparatus 15 proceeds by moving the carrier means 27 toward the hard surface 31 having ply stock S thereon. The cutters A and B are disposed in coplanar relation. Means for maintaining the coplanar relation is illustrated in FIGS. 4, 5, and 6. The cutter shaft 17 carrying cutter A also carries a spring 51 (FIG. 6) arranged to urge the cutter A away from the left side 53 of the link 19. A cutter centering device 55 is mounted swingably about the shaft 17 in axially fixed relation to the cutter A. The device has a substantially semi-circular groove 57 which accommodates a centering or dummy disc 59 fixed on the shaft 61 of the cutter B and spaced axially therefrom. The groove 57 and the dummy disc 59 cooperate to maintain cutter B in coplanar relation with cutter A such that when the latter is displaced axially, as it penetrates the ply stock, by one or the other of the cords or wires of an adjacent pair, such displacement shifts the centering device to the right or left as seen in FIG. 6, which movement also shifts the cutter B to maintain the coplanar relation between the two cutters bu* only during the initial movement of the cutter A along its path between the pair of wires. The cutter B is thereby located axially to enter exactly into the same path. The stud 65 threaded into one side 53 of the link stabilizes the centering device 55 and accommodates a further spring 67 which urges the centering device and, therefore, the two cutters A and B oppositely to the centering spring 51 carried on the cutter shaft 17. The centering means thus also provides for restoring the two cutters A and B to a predetermined plane during the non-cutting part of the operating cycle, as will be observed in FIG. 5. As the carrier means 27 moves toward the table 33, the first cutter A first penetrates the ply stock S and, because of the blunt circular edge, may be displaced along its shaft 17 to accommodate one or the other of the pair of cords or wires. The cutter acts to squeeze the gum between the cords or wires to a zero thickness against the hard surface 31 of the table. When the cutter A encounters the table, it is forced to swing against the resistance of the spring means 41 about its pivot pin 21 thereby displacing the cutter A to the left as seen in FIG. 2. As the cutter A is thus displaced, the cutter centering device 55 which has been displaced with the cutter A, swings away from the dummy disc 59 thereby relocating as required the cutter B to maintain their coplanar relation. As the centering device moves away out of contact with the dummy disc, cutter B remains in the so-aligned coplanar relation and, as the carrier means 27 continues its movement toward the table 33, enters the slot between the wires or cords which has been formed by the cutter A. With the carrier means in its down position illustrated in FIG. 2, the two carriage means 23 and 47 are traversed away from each other by their respective traverse means, the cylinders 71.

Cutters A and B are thereby moved oppositely to the lateral extremities of the ply stock S between the pair of cords or wires. As the disc-cutters roll and squeeze the gum against the hard surface each is relatively free to shift on its own axis sufficiently to accommodate minor deviations encountered in the paths of the cords or wires from the line of travel of the carriage means established by the guide bars 25. The blunt edge rolling against the hard surface does not cut but rather pinches or squeezes the gum to a zero dimension thus tending to maintain the location of the cut equidistant between the respective cords or wires and thus avoids the possibility of damage to one or the other and the possibility of stripping one or the other bare of the gum which covers them.

As the individual cutters move beyond the width of the ply stock, the carrier moving means 39 is again activated to move the carrier means 27 away from the table 33 and the carriage means are then moved to their starting positions illustrated in FIG. 1.

The apparatus illustrated in FIGS. 7, 8, and 9 embodies a second version of the invention in that only one disc cutter C is employed. The apparatus 80 comprises frame means 81 including a hard surface table 83 forming support means, carrier means 85 including the guide bars or rails 87 extending between end members 89, which is mounted slidably on the frame means for movement toward and away from the table, and a single carriage means 91 mounted slidably along the bars of the carrier means to traverse across the table. The disc-cutter C is mounted rotatably about and slidably along the cutter shaft 93 which is carried in the link 95 which provides swing arm means. The link 95 is attached pivotably to the carrier means by a pivot pin 97 and extends outward from the pivot pin and at its latter end connects to a clevis 99 accommodating spring means 101 operable to swing the link clockwise as seen in FIG. 7 against the stop 103 affixed on the carrier means. The carrier moving means 105 may be any suitable mechanism, such as an air cylinder, for moving the carrier means toward and away from the table. Carriage traverse means 107 for traversing the carriage means parallel to the table surface can likewise be provided by any suitable mechanism such as an air cylinder. The ply stock S or sheet material to be parted is moved in a direction normal to the plane of the figures by any suitable conveyor means which, preferably, include means for advancing the ply stock by successive predetermined increments thereby providing uniform length of ply stock suited to the apparatus being served.

In operation the carrier means 85 is moved toward the table 83 which causes the cutter C to enter, as before, between a side-by-side pair of cords or wires. To accommodate minor misalignments of the cutter with respect to the cords or wires at the initiation of the cut, as well as during the progress of the cut traverse to the ply stock, self-centering displaceable means are provided (FIG. 10) by an extension arm 111 secured to a sleeve 113 slidably mounted on the cutter shaft 93 and which sleeve carries the cutter C for rotation about the shaft. The extension arm accommodates a spring cup 115 which is disposed coaxially about a stud 117 adjustably fixed in the swing arm link 95; a first coil spring 119 is disposed about the stud and within the cup, the spring acting between the floor 115a of the cup and the head 117a of the stud to urge the cup and thereby the cutter to the right as seen in FIG. 10. A second spring 121 disposed about the exterior of the cup extends between the swing arm 95 and the extension arm 111 and is arranged to urge the extension arm and, therefore, the disc-cutter C, to the left as seen in FIG. 10. The two springs cooperate to maintain the cutter at a predetermined location along the cutter shaft while at the same time permitting the cutter to be shifted axially of the shaft in response to small deviations of the cords or wires from the path of the carriage means.

In operation the carrier means 85 is moved toward the table 83 causing the disc-cutter C to penetrate the ply stock S between a pair of side-by-side cords or wires to engage the hard surface of the table 83. Continued downward movement toward the table by the carrier means 85 displaces the cutter C toward the right as seen in FIG. 8, rolling the cutter outwardly toward the closer edge of the ply stock S. The carriage means 91 is then traversed toward the left thereby moving the cutter to reenter the groove between the pair of cords or wires and to roll on the hard surface thereby severing or parting the ply stock between the pair of cords or wires.

It has been found that the blunt circular edge of the disc-cutter squeezes out or pinches the gum rubber between the pair of cords or wires without risk of exposing a bare cord or wire or of damaging either of the pair thereof.

I claim:

1. A method of cutting tire making material which has parallel closely spaced cords or wires embedded in uncured rubbery gum, the method comprising supporting said material on an uninterrupted plane hard surface, selecting a rotatable unheated disc cutter having a blunt circular edge, moving said cutter first in a direction normal to said surface to cause the cutter to penetrate said gum between a side-by-side pair of cords or wires and to engage said surface, then while maintaining the blunt edge of said cutter in contact with said surface rolling said cutter in a direction parallel to said surface in a path determined by said pair of cords or wires so as to sever said gum between said pair without baring either and without overheating said gum.

2. A method as claimed in claim 1, and including selecting a second disc cutter having a blunt circular unheated edge, and while the first said cutter is rolled an initial distance causing said second cutter to move along its own rotation axis equally with any displacement of the first cutter along its own axis caused by deviation of one or both of said pair and after said initial distance has been rolled, allowing said second cutter to shift axially independently of the first said cutter.

3. A method as claimed in claim 1, wherein the step of rolling includes rolling said cutter first to and partly beyond the closer edge of said material and then rolling said cutter in the reverse direction in the groove or slot made by rolling in said first direction.

* * * * *